United States Patent
Shih et al.

(10) Patent No.: US 8,421,721 B2
(45) Date of Patent: Apr. 16, 2013

(54) LIGHT EMITTING DIODE DRIVING APPARATUS

(75) Inventors: Fu-Yuan Shih, Hsinchu (TW); Yang-Tai Tseng, Hsinchu (TW)

(73) Assignee: Power Forest Technology Corporation, Hsinchu (TW)

( * ) Notice: Subject to any disclaimer, the term of this patent is extended or adjusted under 35 U.S.C. 154(b) by 145 days.

(21) Appl. No.: 12/960,561

(22) Filed: Dec. 6, 2010

(65) Prior Publication Data

US 2012/0056865 A1  Mar. 8, 2012

(30) Foreign Application Priority Data

Sep. 3, 2010  (TW) ............................... 99129894 A

(51) Int. Cl.
*G09G 3/32* (2006.01)
(52) U.S. Cl.
USPC ............... 345/82; 345/102; 346/61; 362/97.1

(58) Field of Classification Search .................. 345/102, 345/82–83; 349/61–71; 362/97.1–97.4
See application file for complete search history.

(56) References Cited

U.S. PATENT DOCUMENTS

| | | | |
|---|---|---|---|
| 2007/0164928 A1* | 7/2007 | Lee | 345/30 |
| 2008/0002102 A1* | 1/2008 | Lee | 349/68 |
| 2008/0100561 A1* | 5/2008 | Price et al. | 345/102 |
| 2011/0069094 A1* | 3/2011 | Knapp | 345/690 |

* cited by examiner

*Primary Examiner* — Michael Pervan
(74) *Attorney, Agent, or Firm* — Jianq Chyun IP Office

(57) ABSTRACT

A light emitting diode (LED) driving apparatus is provided, which includes a power conversion circuit for receiving and converting an input power so as to generate a DC voltage to simultaneously drive a plurality of LED strings arranged in parallel; and a plurality of current regulation chips each having a single regulation channel and respectively corresponding to the LED strings, wherein an $i^{th}$ current regulation chip is only used for regulating a current flowing through an $i^{th}$ LED string, where i is a positive integer.

10 Claims, 2 Drawing Sheets

LIGHT EMITTING DIODE DRIVING APPARATUS

CROSS-REFERENCE TO RELATED APPLICATION

This application claims the priority benefit of Taiwan application serial no. 99129894, filed on Sep. 3, 2010. The entirety of the above-mentioned patent application is hereby incorporated by reference herein and made a part of this specification.

BACKGROUND

1. Field of the Invention

The invention relates to a light emitting diode (LED) driving apparatus, more particularly, to an LED driving apparatus having features of expandability and current balance/current matching.

2. Description of Related Art

In recent years, with development of semiconductor technology, portable electronic produces and flat panel displays are quickly developed, and in various flat panel displays, a liquid crystal display (LCD) becomes popular in the market due to its advantages of low operating voltage, no irradiation, light weight and small size, etc. Generally, since the LCD panel has no luminescent function itself, a backlight module is required to be disposed under the LCD panel for providing a backlight source to the LCD panel.

The conventional backlight modules are grouped into cold cathode fluorescent lamp (CCFL) backlight modules and light emitting diode (LED) backlight modules. Since the LED backlight module can improve a color gamut of the LCD, the LED backlight modules are generally used to replace the CCFL backlight modules.

The LED backlight module has a plurality of LED strings arranged in parallel, and each of the LED strings consists of a plurality of LEDs connected in series. In an actual application, a DC-DC converter is generally used to convert an input power into a DC voltage for simultaneously driving each of the LED strings. However, since a load feature (I-V curve) of each of the LED strings is different, a current flowing through each of the LED strings is different (i.e. current imbalance), so that not only a light source brightness provided to the LCD panel by the LED backlight module is uneven, but also a service life of the LEDs is shortened.

To resolve such problem, a current balance or current matching control circuit can be added to the LED backlight module to regulate the current flowing through each of the LED strings, so that the current flowing through each of the LED strings can be the same (i.e. current balance/current matching) The commonly used current balance or current matching control circuit may consist of a current feedback compensation circuit or a current mirror circuit formed by a plurality of active devices (for example, metal-oxide-semiconductor field-effect transistors (MOSFETs)). Moreover, the current balance or current matching control circuit may also consist of current regulation chips (for example, current sink integrated circuits (ICs)).

However, a number of regulation channels of the current regulation chip is generally fixed (for example, four or six regulation channels), and since one regulation channel is used for regulating the current flowing through one LED string, when the LED backlight module has ten LED strings (the number is determined according to different panel sizes), three current regulation chips each having four regulation channels or two current regulation chips each having six regulation channels have to be used, so that two regulation channels are useless in both cases, which may cause a waste of cost.

SUMMARY OF THE INVENTION

Accordingly, the invention provides a light emitting diode (LED) driving apparatus having features of expandability and current balance/current matching, which can resolve the problem of the related art, and includes a power conversion circuit for receiving and converting an input power, so as to generate a direct current (DC) voltage to simultaneously drive a plurality of LED strings arranged in parallel; and a plurality of current regulation chips each having a single regulation channel and respectively corresponding to the LED strings, wherein an $i^{th}$ current regulation chip is only used for regulating a current flowing through an $i^{th}$ LED string, where i is a positive integer.

According to the above descriptions, in the LED driving apparatus of the invention, each of the current regulation chips is designed to have a single regulation channel, so as to regulate a current flowing through a single LED string. Therefore, the regulation channel of each of the current regulation chips can be regarded as an accurate current source. Moreover, the independent current regulation chips can also be connected in parallel for expansion. In this way, regardless of the number of the parallel LED strings (and the number is determined according to different panel sizes) in the LED backlight module, as long as an equivalent number of the current regulation chips is used, the current flowing through each of the LED strings can be the same (i.e. current balance/current matching) without causing waste of the cost.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
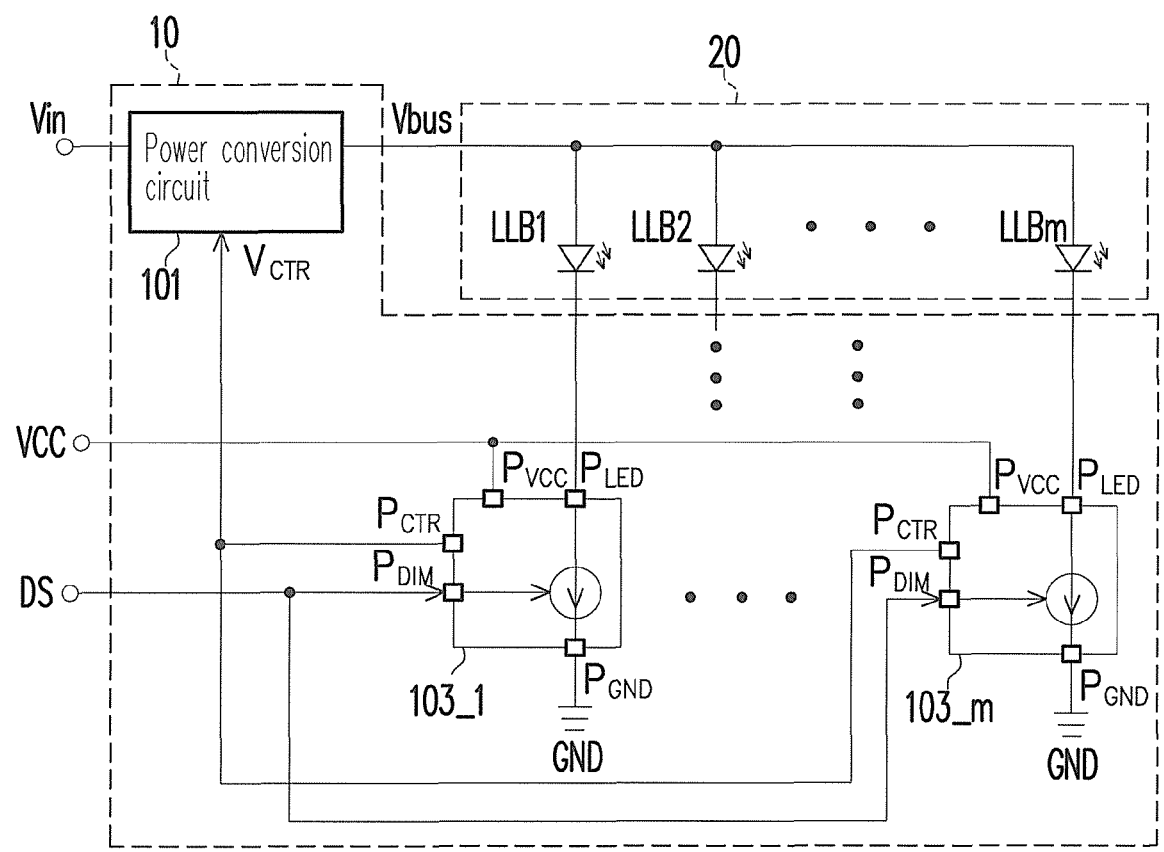
FIG. 1 is a schematic diagram illustrating a light emitting diode (LED) driving apparatus 10 according to an embodiment of the invention.

Reference will now be made in detail to the present exemplary embodiments of the invention, examples of which are illustrated in the accompanying drawings. Wherever possible, the same reference numbers are used in the drawings and the description to refer to the same or like parts.

FIG. 1 is a schematic diagram illustrating a light emitting diode (LED) driving apparatus 10 according to an embodiment of the invention. Referring to FIG. 1, the LED driving apparatus 10 is at least adapted to drive an LED backlight module 20 of a liquid crystal display (LCD), though the invention is not limited thereto. The LED backlight module 20 has a plurality of LED strings LLBi (i=1~m) connected in parallel, and each of the LED strings LLBi (i=1~m) is composed of a plurality of LEDs Li1-LiN (i=1~m) connected in series, as that shown in FIG. 2.

Moreover, the LED driving apparatus 10 includes a power conversion circuit 101 and a plurality of current regulation chips 103_i (i=1~m) each having a single regulation channel. The power conversion circuit 101 is used for receiving an input power Vin so as to generate a direct current (DC) voltage Vbus to simultaneously drive the parallel LED strings LLBi (i=1~m) in the LED backlight module 20.

It should be noticed that in accordance with a type of the input voltage Vin (for example, DC or alternating current (AC) input voltage), the power conversion circuit 101 can be a DC-DC converter (when the input voltage Vin is the DC input voltage) or an AC-DC converter (when the input voltage Vin is the AC input voltage), though the invention is not limited thereto.

On the other hand, the current regulation chips 103_i (i=1~m) respectively correspond to the LED strings LLBi (i=1~m), and an $i^{th}$ current regulation chip 103_i (i=1~m) is only used for regulating a current flowing through an $i^{th}$ LED string LLBi (i=1~m). For example, the current regulation chips 103_1 corresponds to the LED string LLB1, and the current regulation chips 103_2 corresponds to the LED string LLB2, and the others are deduced by analogy. Moreover, the first current regulation chips 103_1 is only used for regulating a current flowing through the first LED string LLB1, and the second current regulation chips 103_2 is only used for regulating a current flowing through the second LED string LLB2, and the others are deduced by analogy.

Figure 2:
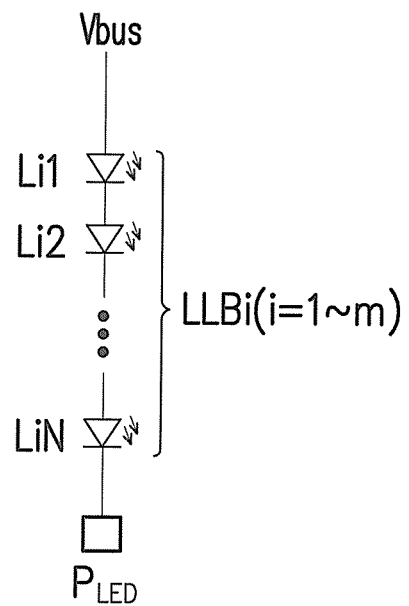
FIG. 2 is a schematic diagram illustrating a LED string LLBi (i=1~m) according to an embodiment of the invention.
Figure 3:
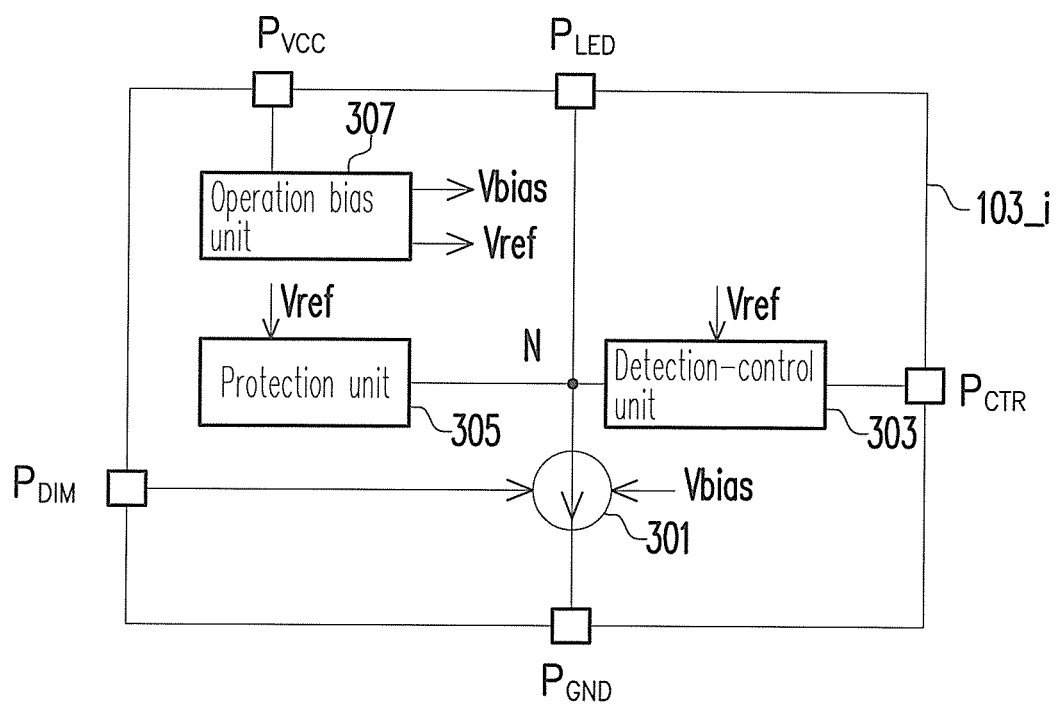
FIG. 3 is a schematic diagram illustrating an $i^{th}$ current regulation chip 103_i (i=1~m) according to an embodiment of the invention.

In detail, FIG. 3 is a schematic diagram illustrating the $i^{th}$ current regulation chip 103_i (i=1~m) according to an embodiment of the invention. Referring to FIGS. 1-3, in the present embodiment, the $i^{th}$ current regulation chip 103_i (i=1~m) includes a controllable current source 301, a detection-control unit 303, a protection unit 305 and an operation bias unit 307.

It should be noticed that in the present embodiment, the controllable current source 301, the detection-control unit 303, the protection unit 305 and the operation bias unit 307 in each of the current regulation chips 103_i (i=1~m) can be packaged to form an integrated circuit (IC) having five pins (i.e. $P_{VCC}$, $P_{GND}$, $P_{LED}$, $P_{CTR}$ and $P_{DIM}$, though the invention is not limited thereto).

The first current regulation chip 103_1 (i=1) is taken as an example for description, and the other current regulation chips 103_2-103_m (i=2~m) can be deduced by analogy.

In the first current regulation chip 103_1, the controllable current source 301 is coupled between the first LED string LLB1 and a ground GND through the pins $P_{LED}$ and $P_{GND}$, and provides a constant current source in response to a dimming signal DS. In the present embodiment, the controllable current source 301 is controlled by the dimming signal DS through the pin $P_{DIM}$, and the dimming signal DS is used for adjusting brightness of the first LED string LLB1, i.e. adjusting a magnitude of the constant current source provided by the controllable current source 301. A voltage level of the dimming signal DS or a duty cycle of the dimming signal DS can be changed in order to adjust the magnitude of the constant current source provided by the controllable current source 301, though the invention is not limited thereto.

Moreover, the detection-control unit 303 is coupled to a node N between the controllable current source 301 and the first LED string LLB1, and is used for detecting a voltage drop/headroom of the controllable current source 301, and accordingly outputting a control voltage $V_{CTR}$ (which can be a linear signal or digital signal) through the pin $P_{CTR}$ to control a magnitude of the DC voltage Vbus generated by the power conversion circuit 101, so as to regulate the voltage drop of the controllable current source 301, and reduce a power depletion of the controllable current source 301. Moreover, the protection unit 305 is also coupled to the node N, and is used for protecting the first current regulation chip 103_1 from damage due to over voltage, over power, over temperature or other factors.

In addition, the operation bias unit 307 is coupled to the controllable current source 301, the detection-control unit 303 and the protection unit 305, and is for receiving an external supply voltage VCC through the pin $P_{VCC}$, and accordingly providing a bias voltage Vbias required by the controllable current source 301 and providing a reference voltage Vref required by the detection-control unit 303 and the protection unit 305.

In the present embodiment, the pins $P_{DIM}$ of all of the current regulation chips 103_i (i=1~m) can be directly connected. In this way, the controllable current source 301 in each of the current regulation chips 103_i (i=1~m) can be controlled by the same dimming signal DS, so as to synchronously regulate the brightness of the LED strings LLBi (i=1~m). Certainly, in other embodiments of the invention, the controllable current source 301 in each of the current regulation chips 103_i (i=1~m) can also be controlled by a different dimming signal DS, so as to independently/respectively regulate the brightness of each of the LED strings LLBi (i=1~m), namely, a local dimming function is achieved according to such method. Herein, the controllable current source 301 in each of the current regulation chips 103_i (i=1~m) which is controlled by the same or different dimming signal DS is determined by an actual design requirement.

On the other hand, the pins $P_{CTR}$ of all of the current regulation chips 103_i (i=1~m) can also be directly connected. In this way, the control voltages $V_{CTR}$ output by the detection-control units 303 in the current regulation chips 103_i (i=1~m) are mutually coupled, so that a minimum control voltage $V_{CTR}$ can control the magnitude of the DC voltage Vbus generated by the power conversion circuit 101, i.e. the minimum control voltage $V_{CTR}$ may obtain a control power of the power conversion circuit 101.

It should be noticed that an enough voltage drop on the controllable current source 301 have to be maintained to maintain the constant current source provided by the controllable current source 301 in each of the current regulation chips 103_i (i=1~m). However, since a load feature of each of the LED strings LLBi (i=1~m) is probably different, the voltage drop on the corresponding controllable current source 301 caused by different LED string LLBi (i=1~m) may be different. Therefore, an excessive voltage drop may cause excessive power dissipation of the controllable current source 301, so that efficiency of the controllable current source 301 is reduced.

Accordingly, in the present embodiment, the minimum control voltage $V_{CTR}$ is used to control the power conversion circuit 101 to avoid a situation that the controllable current source 301 in each of the current regulation chips 103_i (i=1~m) generates excessive power dissipation. Therefore, it is applicable as long as the DC voltage Vbus generated by the power conversion circuit 101 can maintain the enough voltage drop of the controllable current source 301 in each of the current regulation chips 103_i (i=1~m) to maintain the constant current source. Certainly, in other embodiments of the invention, a maximum control voltage $V_{CTR}$ or an average of the control voltages $V_{CTR}$ can be used to control the power conversion circuit 101, which can be determined by an actual design requirement.

Similarly, the pins $P_{VCC}$ of all of the current regulation chips 103_$i$ (i=1~m) can also be directly connected, and the pins $P_{GND}$ of all of the current regulation chips 103_$i$ (i=1~m) can also be directly connected. In this way, the operation bias unit 307 in each of the current regulation chips 103$i$ (i=1~m) can receive the same external supply voltage VCC, so that all of the current regulation chips 103_$i$ (i=1~m) are operated by the same operation voltage. Therefore, the independent current regulation chips 103_$i$ (i=1~m) can be connected in parallel through the corresponding pins ($P_{VCC}$, $P_{GND}$, $P_{CTR}$ and $P_{DIM}$), so as to achieve a purpose/mechanism of expandability.

Moreover, although each of the current regulation chips 103_$i$ (i=1~m) is an IC having five pins, the invention is not limited thereto. In other words, if the LED backlight module 10 does not have a dimming function, the pin $P_{DIM}$ of each of the current regulation chips 103_$i$ (i=1~m) can be omitted, so that each of the current regulation chips 103_$i$ (i=1~m) becomes an IC having four pins, which is determined by an actual design requirement.

In summary, in the LED driving apparatus of the invention, each of the current regulation chips is designed to have a single regulation channel, so as to regulate a current flowing through a single LED string. Moreover, the independent current regulation chips can be connected in parallel for expansion. In this way, regardless of the number of the parallel LED strings (and the number is determined according to different panel sizes) in the LED backlight module, as long as an equivalent number of the current regulation chips is used, the current flowing through each of the LED strings can be the same (i.e. current balance/current matching) without causing waste of the cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A light emitting diode (LED) driving apparatus, comprising:
    a power conversion circuit, for receiving and converting an input power, so as to generate a direct current (DC) voltage to simultaneously drive a plurality of LED strings arranged in parallel; and
    a plurality of current regulation chips, each having a single regulation channel and respectively corresponding to the LED strings, wherein an $i^{th}$ current regulation chip is only used for regulating a current flowing through an $i^{th}$ LED string, where i is a positive integer,
    wherein the $i^{th}$ current regulation chip comprises:
        a controllable current source, coupled between the $i^{th}$ LED string and a ground, for providing a constant current in response to a dimming signal; and
        a detection-control unit, coupled to a node between the controllable current source and the $i^{th}$ LED string, for detecting a voltage drop of the controllable current source, and accordingly outputting a control voltage to control a magnitude of the DC voltage generated by the power conversion circuit, so as to regulate-down the voltage drop of the controllable current source to a predetermined voltage drop which makes the controllable current source to be maintained as a constant current source, and then to reduce a power depletion of the controllable current source.

2. The LED driving apparatus as claimed in claim 1, wherein the $i^{th}$ current regulation chip further comprises:
    a protection unit, coupled to the node, for protecting the $i^{th}$ current regulation chip from damaging due to one of over voltage, over power and over current or a combination thereof; and
    an operation bias unit, coupled to the controllable current source, the detection-control unit and the protection unit, for receiving an external supply voltage, and accordingly providing a bias required by the controllable current source and providing a reference voltage required by the detection-control unit and the protection unit.

3. The LED driving apparatus as claimed in claim 2, wherein the controllable current source in each of the current regulation chips is controlled by the same dimming signal, and the dimming signal is used for adjusting brightness of the LED strings.

4. The LED driving apparatus as claimed in claim 2, wherein the control voltages output by the detection-control units in the current regulation chips are mutually coupled, so that only a minimum one of the control voltages controls the magnitude of the DC voltage generated by the power conversion circuit.

5. The LED driving apparatus as claimed in claim 2, wherein the operation bias unit in each of the current regulation chips receives the same external supply voltage.

6. The LED driving apparatus as claimed in claim 2, wherein the controllable current source, the detection-control unit, the protection unit and the operation bias unit in each of the current regulation chips are packaged into an integrated circuit having a plurality of pins.

7. The LED driving apparatus as claimed in claim 1, wherein the input power is an alternating current (AC) input power or a DC input power.

8. The LED driving apparatus as claimed in claim 7, wherein if the input power is the AC input power, the power conversion circuit is an AC-DC converter.

9. The LED driving apparatus as claimed in claim 7, wherein if the input power is the DC input power, the power conversion circuit is a DC-DC converter.

10. The LED driving apparatus as claimed in claim 1, wherein the LED driving apparatus is at least adapted to drive an LED backlight module of a liquid crystal display (LCD).

* * * * *